United States Patent
Ma et al.

(10) Patent No.: US 7,987,179 B2
(45) Date of Patent: Jul. 26, 2011

(54) METHOD AND APPARATUS FOR OPTIMIZING QUERIES OVER VERTICALLY STORED DATABASE

(75) Inventors: Li Ma, Beijing (CN); Yue Pan, Beijing (CN); Chen Wang, Beijing (CN); Ying Yan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 12/271,038

(22) Filed: Nov. 14, 2008

(65) Prior Publication Data
US 2009/0132474 A1  May 21, 2009

(30) Foreign Application Priority Data

Nov. 16, 2007  (CN) .......................... 2007 1 0192738

(51) Int. Cl.
*G06F 17/30* (2006.01)
(52) U.S. Cl. ...................................................... 707/713
(58) Field of Classification Search ........................ None
See application file for complete search history.

(56) References Cited

U.S. PATENT DOCUMENTS

| | | | |
|---|---|---|---|
| 6,757,675 B2 * | 6/2004 | Aiken et al. ........................ 1/1 |
| 6,925,457 B2 | 8/2005 | Britton et al. | |
| 7,725,704 B1 * | 5/2010 | Beaverson et al. ............... 713/2 |
| 2006/0036620 A1 | 2/2006 | Bigwood et al. | |
| 2006/0235823 A1 * | 10/2006 | Chong et al. ..................... 707/1 |
| 2007/0100913 A1 * | 5/2007 | Sumner et al. ................ 707/204 |
| 2008/0114730 A1 * | 5/2008 | Larimore et al. ................. 707/3 |

OTHER PUBLICATIONS

Yun-Fei Lei, Principle of converting RDF Query Language to SQL and its implementation, Jisuanji Yanjiu Yu Fazhan Computer Research and Dev vol. 41 Iss 7 2004 pp. 1251-1257.
Eugene Inseok Chong, An Efficient SQL-based RDF Querying Scheme, Oracle, One Oracle Drive, Nashua NH 03062.
Frank Manola and Eric Miller, RDF Primer, W3C Recommendation, Feb. 10, 2004.
E. Prud'Hommeaux and A. Seaborne, SPARQL query language for RDF, W3C candidate recommendation, Apr. 2006.

* cited by examiner

*Primary Examiner* — Apu M Mofiz
*Assistant Examiner* — Thu Nga Nguyen
(74) *Attorney, Agent, or Firm* — Gail H. Zarick

(57) ABSTRACT

A method and device for optimizing queries over a vertically stored database. Items in the database are partitioned into several partitions each having a partition signature. The method includes decomposing a first query received from a user into multiple first subqueries; generating a signature for each first subquery in a way corresponding to the way of generating the partition signature; comparing the signature of each first subquery with partition signatures of all partitions respectively to obtain all partitions matching the first subquery; rewriting a second subquery translated from the first subquery based on the matching partitions to obtain a rewritten second subquery; and composing rewritten second subqueries for all first subqueries to form a second query so that queries are executed over the database using the second query.

13 Claims, 10 Drawing Sheets

| Subject | Property | Object |
|---|---|---|
| ... | | |
| :SXZ | :typeOf | :Professor |
| :WC | :typeOf | :Professor |
| :WXY | :typeOf | :Professor |
| :SXZ | :teach | :Course1 |
| :WC | :teach | :Course1 |
| :WXY | :teach | :Course2 |
| :ML | :typeOf | :Professor |
| :CF | :typeOf | :Professor |
| :ML | :teach | :Course0 |
| :CF | :teach | :Course0 |
| :PY | :typeOf | :VisitingProfessor |
| :PY | :teach | :Course0 |
| ... | | |

FIG. 1

| Subject | Property | Object | Partition Identifier |
|---|---|---|---|
| ... | | | |
| :SXZ | :typeOf | :Professor | 1 |
| :WC | :typeOf | :Professor | 1 |
| :WXY | :typeOf | :Professor | 1 |
| :SXZ | :teach | :Course1 | 1 |
| :WC | :teach | :Course1 | 1 |
| :WXY | :teach | :Course2 | 1 |
| :ML | :typeOf | :Professor | 2 |
| :CF | :typeOf | :Professor | 2 |
| :ML | :teach | :Course0 | 2 |
| :CF | :teach | :Course0 | 2 |
| :PY | :typeOf | :VisitingProfessor | |
| :PY | :teach | :Course0 | 3 |
| ... | | | 3 |

| m/n | k | k=1 | k=2 | k=3 | k=4 | k=5 | k=6 | k=7 | k=8 |
|---|---|---|---|---|---|---|---|---|---|
| 2 | 1.39 | 0.393 | 0.400 | | | | | | |
| 3 | 2.08 | 0.283 | 0.237 | 0.253 | | | | | |
| 4 | 2.77 | 0.221 | 0.155 | 0.147 | 0.160 | | | | |
| 5 | 3.46 | 0.181 | 0.109 | 0.092 | 0.092 | 0.101 | | | |
| 6 | 4.16 | 0.154 | 0.0804 | 0.0609 | 0.0561 | 0.0578 | 0.0638 | | |
| 7 | 4.85 | 0.133 | 0.0618 | 0.0423 | 0.0359 | 0.0347 | 0.0364 | | |
| 8 | 5.55 | 0.118 | 0.0489 | 0.0306 | 0.024 | 0.0217 | 0.0216 | 0.0229 | |
| 9 | 6.24 | 0.105 | 0.0397 | 0.0228 | 0.0166 | 0.0141 | 0.0133 | 0.0135 | 0.0145 |
| 10 | 6.93 | 0.0952 | 0.0329 | 0.0174 | 0.0118 | 0.00943 | 0.00844 | 0.00819 | 0.00846 |
| 11 | 7.62 | 0.0869 | 0.0276 | 0.0136 | 0.00864 | 0.0065 | 0.00552 | 0.00513 | 0.00509 |
| 12 | 8.32 | 0.08 | 0.0236 | 0.0108 | 0.00646 | 0.00459 | 0.00371 | 0.00329 | 0.00314 |
| 13 | 9.01 | 0.074 | 0.0203 | 0.00875 | 0.00492 | 0.00332 | 0.00255 | 0.00217 | 0.00199 |
| 14 | 9.7 | 0.0689 | 0.0177 | 0.00718 | 0.00381 | 0.00244 | 0.00179 | 0.00146 | 0.00129 |

METHOD AND APPARATUS FOR OPTIMIZING QUERIES OVER VERTICALLY STORED DATABASE

CROSS REFERENCE TO RELATED APPLICATION

This application claims priority under 35 U.S.C. §119 from Chinese Patent Application No. 200710192738.2 filed Nov. 16, 2007, the entire contents of which are incorporated herein by reference.

BACKGROUND OF THE INVENTION

1. Field of the Invention

The present invention generally relates to the field of database management and, in particular, to a method and a device for optimizing queries over a vertically stored database.

2. Description of the Related Art

RDF (Resource Description Framework) was proposed as a language used to describe metadata (information), particularly for the metadata of resources on the World Wide Web pages where each resource can be identified using a URI (Universal Resource Identifier). With the progress of semantic Web technologies, RDF was recommended as a standard by W3C (World Wide Web Consortium) to exchange information among multiple resources in semantic Web applications.

FIG. 1 illustrates an example of an RDF data storage table. As illustrated in FIG. 1, generally in the RDF data storage structure RDF data is a group of triples, each of which is composed of a subject, a property, and an object. For example, the triple in the second row of the storage table illustrated in FIG. 1 represents the fact "SXZ is a professor," wherein "SXZ" is the subject, "typeOf" is the property, and "Professor" is the object. And the triple in the fifth row of the storage table illustrated in FIG. 1 represents the fact "SXZ teaches course 1," wherein "SXZ" is the subject, "Teach" is the property, and "Course1" is the object. In current RDF, the values of subjects and properties must ultimately be resolved to universal resource identifiers (URIs). The values of objects may be either universal resource identifiers or literal values such as numbers or character strings.

Such an RDF data storage structure is essentially a vertical data storage structure. That is, each item only represents a simple fact, such as the item "SXZ is a professor" and "the item "SXZ teaches course 1." On the contrary, a legacy relational database is a horizontal data storage structure. That is, each item represents all relationships of the subject, such as the item "SXZ is a professor and teaches course 1."

RDF triples may also be presented as a graph, in which the subject may be represented by the source node in the graph, the object indicating a URI may be represented by the sink node in the graph, and the property may be represented by a directed connection connecting the source node to the sink node. A subject may of course be related to multiple objects. For example, the triple in FIG. 1 may be represented by a directed graph as illustrated in FIG. 2. For a complete description of RDF, see Frank Manola and Eric Miller, "RDF primer. W3C recommendation, February 2004" available at http://www.w3.org/TR/rdf-primer. The entire contents of the RDF Primer are hereby incorporated by reference.

Undoubtedly, RDF is becoming a cornerstone of the semantic Web. In order to perform semantic queries over enterprise wide heterogeneous data sources, the existing data needs to be transformed into RDF triples. Meanwhile for RDF triple data, semantic Web query languages like SPARQL have been developed to describe query conditions of users. For a detailed description of SPARQL, see E. Prud'hommeaux and A. Seaborne, "SPARQL query language for RDF. W3C candidate recommendation, April 2006," which is hereby incorporated by reference.

Over the past decades, mature RDB (Relational Database) technologies have been widely accepted to manage various application data. Currently, there are two general ways to manage RDF data using mature relational database technologies. One is to migrate the existing data into a particular RDB-based RDF triple store using ETL (Extract-transform-load) approaches, over which users can query and manage the data stored in a triple form. The other is to create a virtual RDF view over the legacy relational database, by which RDF queries will be translated into SQLs (Structured Query Languages) that are executable in the legacy system. The present invention focuses on the first way that the RDF data is managed in an RDF triple store built on top of a relational database.

According to the storage design of RDB-based RDF triple stores, triple stores can be further divided into three categories:

1) generic RDF triple store,
2) improved RDF triple store, and
3) horizontal/binary table store.

For the generic RDF triple store, triples are directly stored in a generic table with three columns of subject, property, and object, on which a few composite indices are created to improved their query performance. For example, both Oracle 10gR2 Spatial Database and Jena2 employ typical generic triple stores.

Compared with the generic triple store, the improved triple store is able to manage much more expressive RDFS (RDF Schema)/OWL (Web Ontology Language) ontologies and their corresponding instances. Similar to RDF, RDFS and OWL are recommended by W3C to support ontology representation. By extending RDF, RDFS provides the ability to define class inheritance and the basic facility of domain/range. OWL allows defining richer properties and relationships and provides much more restrictions against RDFS. Besides the triple table, the improved triple store also provides additional schema, e.g., "class/property table" and "someValueForm/allValueForm table," to keep the expressive RDFS/OWL ontologies, to which the instance stored in the triple table can be populated accordingly. These additional tables are considered to further facilitate the ontological inference on the RDF data. Examples of the improved triple store include IBM Webify Triple Store, IBM SOR, and Sesame on MySQL.

Different to these two kinds of triple stores above, the horizontal/binary table store will shred the RDF data into multiple horizontal/binary tables, where property is regarded as table name, and each column is regarded as the subject and object of triples respectively. The representative examples are DLDB-OWL and Sesame on PosteGre. The schema of horizontal/binary table store is always consistent with the ontology model stored. Once the ontology evolves, the schema has to change accordingly. It is very costly. Therefore, most of research interests on the RDF stores have been moved to the triple stores. The present invention is applicable to both generic triple stores and improved triple stores.

Currently, many optimizations have been done on the triple stores to improve query performance. For example, in order to save the space cost, most of triple stores internally assign URIs and literal values with unique IDs (unique identifiers) and separately store them in a mapping table, which will be further referenced from the triple table. To promote index efficacy built on literal values, some triple stores physically divide the literal value mapping table into several ones with different data types. To narrow the query scope, some triple stores distinguish relationship properties and datatype properties, and keep them in separate tables. Furthermore, utilizing some specific database features like the MDC (Multi-Dimensional Clustering) table supported in IBM DB2, some triple stores localize the triples in terms of their properties, which can help fast locate and cache the triples satisfying the query conditions.

Although so many optimizations have been used in triple stores, the query performance is still unacceptable. To this end, in the art there is a special need for a schema capable of improving the query performance over a vertically stored database.

SUMMARY OF THE INVENTION

It is an object of the present invention to provide a method and a device for optimizing queries over a vertically stored database. The method and device of the present invention can optimize queries over the vertically stored database structure in order to achieve higher query efficacy.

According to an aspect of the present invention, there is provided a method for optimizing queries over a vertically stored database. Items in the database are partitioned into several partitions each having a partition signature representing items in it. The method includes decomposing a first query received from a user into multiple first subqueries; generating a signature for each first subquery in a way corresponding to the way of generating the partition signature; comparing the signature of each first subquery with partition signatures of all partitions to obtain all partitions matching the first subquery; rewriting a second subquery translated from the first subquery based on the matching partitions to obtain a rewritten second subquery; and composing the rewritten second subqueries for all first subqueries to form a second query, so that queries are executed over the database using the second query.

According to another aspect of the present invention, there is provided a method for processing a vertically stored database. The method may include: partitioning all items in the database into several partitions; assigning each partition with a unique identifier; and generating a signature for each partition.

According to a further aspect of the present invention, there is provided a device for optimizing queries over a vertically stored database. Items in the database are partitioned into several partitions each having a partition signature representing items in it. The device may include: decomposing means for decomposing a first query received from a user into multiple first subqueries; query signature generating means for generating a signature for each first subquery in a way corresponding to the way of generating the partition signature; partition obtaining means for comparing the signature of each first subquery with partition signatures of all partitions respectively, in order to obtain all partitions matching the first subquery; query rewriting means for rewriting a second subquery translated from the first subquery based on the matching partitions in order to obtain a rewritten second subquery; and query composing means for composing the rewritten second subqueries for all first subqueries to form a second query, whereby queries are executed over the database using the second query.

According to a still further aspect of the present invention, there is provided a device for processing a vertically stored database. The device may include: partitioning means for partitioning all items in the database into several partitions; assigning means for assigning each partition with a unique identifier; and partition signature generating means for generating a signature for each partition.

The query efficacy over the database can be improved greatly by employing the method of the present invention.

BRIEF DESCRIPTION OF THE DRAWINGS

FIG. 1 is a schematic view of an RDF triple storage table in the prior art;

FIG. 7 illustrates the possibility of false positive using the corresponding parameters;

The features, advantages, and other aspects of the present invention will become more apparent from the following detailed description, when taken in conjunction with the accompanying drawings.

DESCRIPTION OF THE PREFERRED EMBODIMENTS

The basic principle of the present invention is to partition the legacy vertically stored database and then perform queries only over related partitions, whereby the query efficacy can be improved.

For the purpose of description, description of embodiments of the present invention will be given below in the context of an example of a RDF triple storage structure as a vertically stored database structure. However, it is to be understood to those skilled in the art that the present invention is not limited to RDF triple storage structures and is applicable to other vertically stored data structures such as data storage structures applied in e-business databases.

Additionally, description will be given below in the context of an example of an SPARQL query as a first query received from a user. It is to be understood that a first query received from a user is not limited to an SPARQL query and can be any other proper query.

Data Preparation Procedure

Detailed description will be given below to the data preparation procedure of the present invention. According to the present invention, triples in the RDF store are first partitioned into several partitions, and a signature is created for each partition.

In an embodiment according to the present invention, triples in the RDF store are partitioned into several partitions using graph partitioning technology on the principle that within partitions the connections are denser and between partitions the connections are sparser, and the connections across partitions are backed up in the corresponding partitions.

Graph partitioning technology is a traditional discipline used to partition a graph into several partitions (subgraphs), which is often used in the fields of parallel computing and VLSI design. A detailed description thereof is omitted here. Currently, the most frequently used graph partitioning technology is, for example, METIS graph partitioning tool. It is to be understood that the present invention can employ any other graph partitioning tool besides METIS graph partitioning tool.

Figure 2:
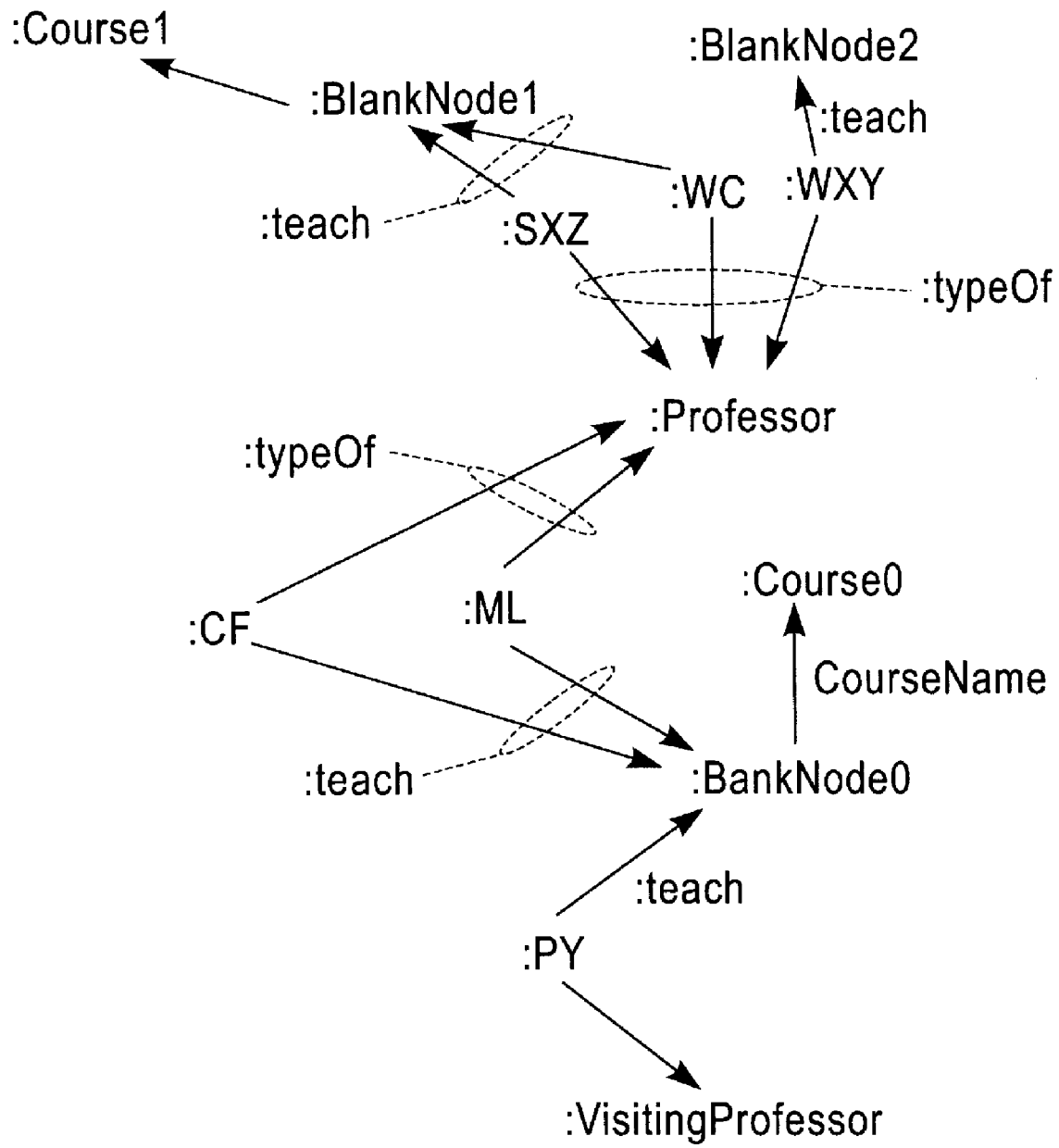
FIG. 2 is a schematic view of an RDF triple mapping graph in the prior art.
Figures 3, 4:
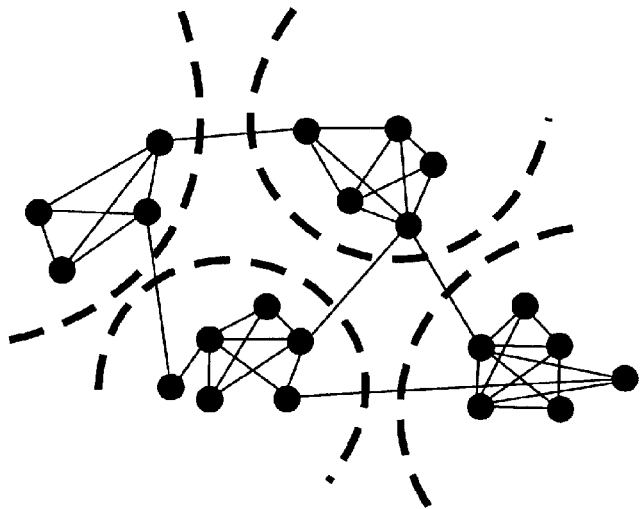
FIG. 3 is a schematic view of graph partitioning of RDF triples according to the present invention.
FIG. 4 is a schematic view of an RDF data storage table according to the present invention.

Specifically, as illustrated in FIG. 3, the RDF triples in the RDF store are firstly mapped to a graph. The subjects of the RDF triples can be represented by source nodes in the graph, the objects of the RDF triples can be represented by sink nodes in the graph, and the RDF properties can be represented by directed connections from the source nodes to the sink nodes. Then, the formed graph is partitioned, with common graph partitioning tool such as METIS, into several subgraphs each of which corresponds to a partition. To ensure integrity of data relationships, a copy of a triple corresponding to a connection across partitions can be made in each related partition.

According to an embodiment of the present invention, the formed graph can be partitioned such that connections within partitions are denser and connections between partitions are sparser. Meanwhile, a copy corresponding to a connection across partitions can be made in each related partition in order to keep integrity of data relationships after partitioning.

Traditionally, RDF data is stored in a triple table which has an RDF subject column whose value is RDF triple subjects, an RDF property column whose value is RDF triple properties, and an object column whose value is RDF triple objects. In the present invention, each partition is assigned with a unique identifier identifying the partition. To keep identifiers of partitions, there is added to the triple table a new column whose value represents a unique identifier column of the partition where the corresponding RDF triple is located. In this manner, the triple table {subject, property, object} changes to the quad form of {subject, property, object, partition id}. FIG. 4 illustrates an RDF data storage table after partitioning according to the present invention.

Further, a signature is created for each partition in the present invention. A signature originates from text retrieval and object retrieval. Its advantages include narrowing search spaces by filtering a "fingerprint" and then performing an exact query in a relatively small dataset.

Figure 5:
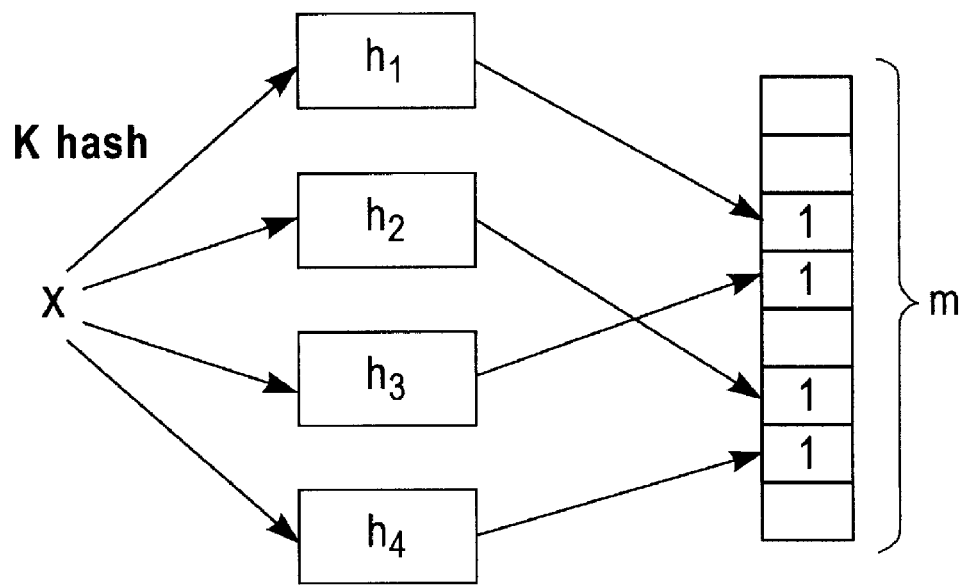
FIG. 5 illustrates an example of creating a signature using a bloom filter method.

In an embodiment of the present invention, the classical method of bloom filter is utilized to create a signature for each partition. The bloom filter method is used to build a bit vector for a set of objects and test its membership. For example, when a user wants to insert an element of x into the filter corresponding to set S, k entries or numbers need to be obtained with k independent hash functions and then the corresponding entries in the bit vector are set to 1. FIG. 5 shows an example of creating a signature using the bloom filter method, in which four hash functions are utilized.

Figure 6:
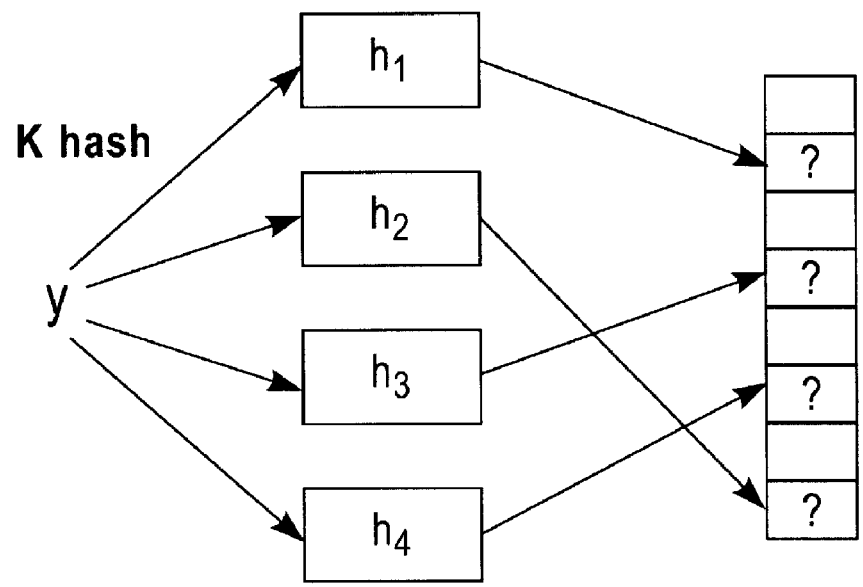
FIG. 6 illustrates an example of testing membership using the bloom filter method.

Similarly, when a user wants to test membership for an element y within the set S, k entries should be obtained with the same k hash functions and then a test is performed to determine if all k corresponding entries in the bit vector of the set S are 1. If yes, the y is possibly a member of the set S and this is later validated using an exact query. FIG. 6 illustrates an example of testing membership using the bloom filter method, in which three of the same hash functions are utilized.

The bloom filter method is a useful way to create signatures, where the false positives have been proved in theory. FIG. 7 illustrates the possibility of false positives using the corresponding parameters. Note that the k is the number of hash functions used, n is the number of URIs of a particular partition in the RDF data, and m is the length of the bit vector. In experiments, k=4 and m/n=5 are selected as the default parameters. As is clear from FIG. 7, the possibility of false positives is 9.2% at this point.

In order to secure the independence of the hash functions, a famous cryptographic message digest algorithm (MD5 method) is adopted to generate the hash values for URIs in every entry of each database. It should be noted that the present invention can also use other algorithms to generate the hash values for respective URIs.

Figure 8:
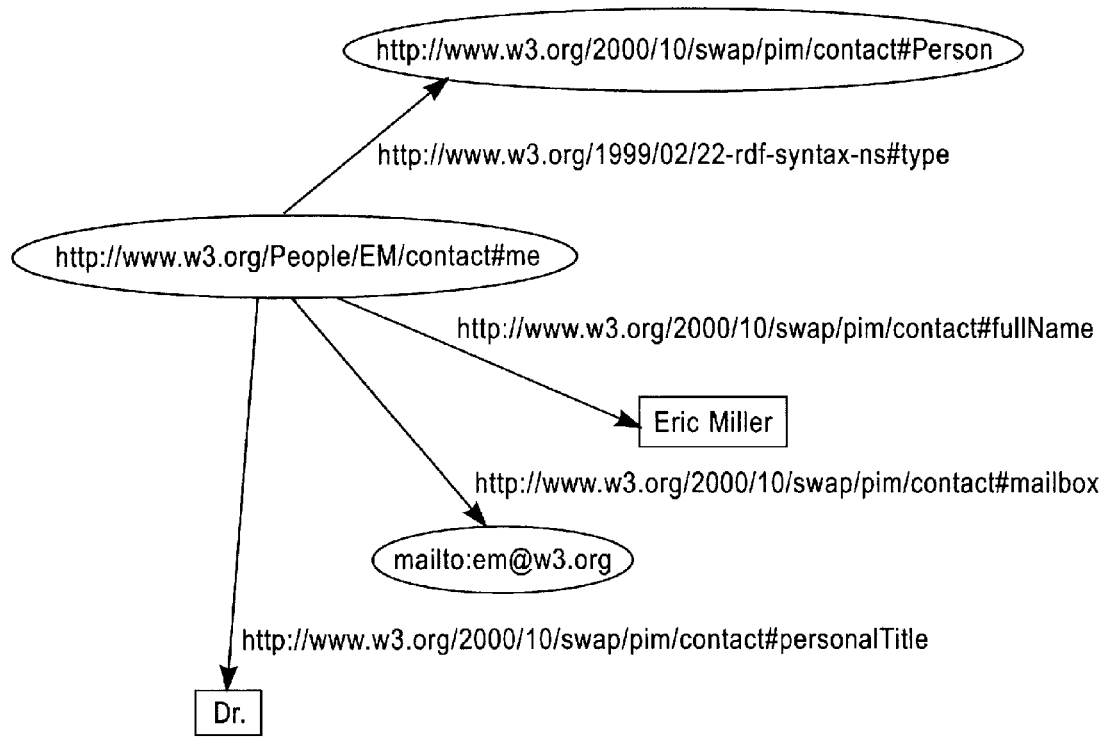
FIG. 8 illustrates an example of creating a signature based on the partitioning of URIs.

FIG. 8 illustrates an example of creating a signature based on the partitioning of URIs. In this example, each URI will be hashed into two entries using two hash functions. Next, an OR operation is performed on the bit vectors for each triple in order to get the signature of each triple. Meanwhile, an OR operation is performed on the signature vectors for all triples within the partition in order to get the signature of the partition.

For example, the first row in the lower table in FIG. 8 represents the following: the hash value of the subject "dc:me" is the signature vector wherein the second and fifth bits from the right to the left are set to "1," and the hash value of the property "rdf:type" is the signature vector wherein the sixth and eighth bits are set to "1," and the hash value of the object "dc:person" is the signature vector wherein the first and second bits are set to "1." Next, an OR operation is performed on the signature of each metadata in the triple, whereby the signature vector "10110011" of the triple in the first row is gotten, and so on and so forth. The signature vectors of all triples in the partition are gotten. Finally, an OR operation is performed on the signature vectors of all triples in the partition whereby the signature value of the partition is gotten.

It is to be understood that the present invention may adopt various mechanisms for generating a signature for a partition provided that the generated signature is able to reflect the triples this partition includes.

Figure 9:
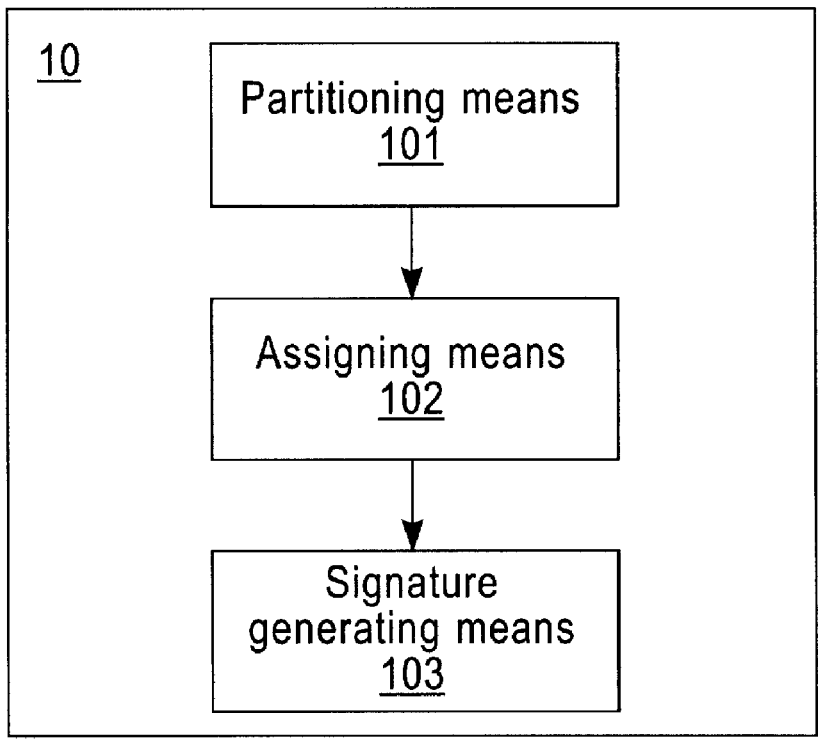
FIG. 9 illustrates a schematic view of a device for processing a vertically stored database according to the present invention.

Referring to FIG. 9, a device for processing a vertically stored database according to the present invention will be described in detail below.

As illustrated in FIG. 9, a device 10 for processing a vertically stored database according to the present invention may include partitioning means 101 for partitioning entries in this database into several partitions, assigning means 102 for assigning each partition with a unique identifier, and partition signature generating means 103 for generating a signature for each partition.

Figure 10:
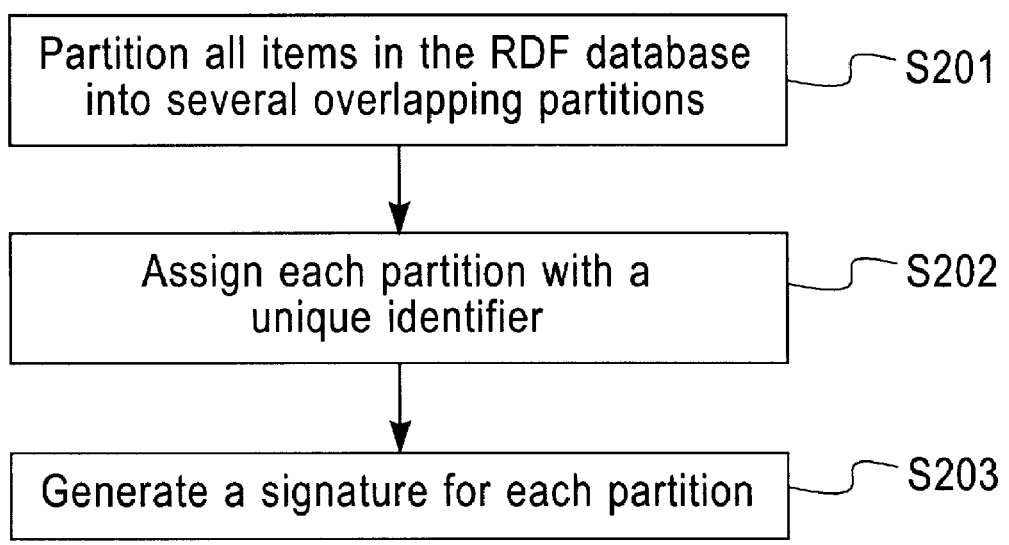
FIG. 10 illustrates a schematic view of a method for processing a vertically stored database according to the present invention.

Referring to the flowchart in FIG. 10, a detailed description will be given to the operation of each component of device 10 for processing a vertically stored database 11 according to the present invention. FIG. 10 describes the flow of a method for processing a vertically stored database according to the present invention.

As illustrated in FIG. 10, in step S201, partitioning means 101 may partition all items in the RDF store into several partitions. Specifically, partitioning means 101 maps all items in RDF database 11 to a graph representing all RDF triples, wherein the subjects of the RDF triples may be represented by source nodes in the graph, the objects of the RDF triples may be represented by sink nodes in the graph, and the properties of the RDF triples may be represented by directed connections from the source nodes to the sink nodes. Next, partitioning means 101 uses the above-described graph partitioning method to partition this graph into several subgraphs each of which corresponds to a partition.

In an embodiment of the present invention, the graph is partitioned into several subgraphs such that connections within them are denser and connections between them are sparser. A copy of a connection between subgraphs is made in each related subgraph so that subgraphs after partitioning may reflect all data relationships in the RDF store.

Next, in step S202, partitioning means 102 assigns each partition a unique identifier, such as partition identifiers 1, 2, and 3 illustrated in FIG. 4.

Then, in step S203, partition signature generating means 103 generates a signature for each partition according to the above-described method for creating a signature.

In this manner, a RDF store in the structure as illustrated in FIG. 8 may be obtained. The RDF store may contain a subject column whose value represents RDF subjects, a property column whose value represents RDF properties, an object column whose value represents RDF objects, and a unique identifier column whose value represents partitions where corresponding RDF triples are located. Additionally, each triple and a signature thereof may be obtained.

According to the present invention, once a new RDF triple is added to the RDF store, a partition where the new triple is stored is obtained, and a new signature is generated for this partition. According to the present invention, a partition identifier and the partition's signature value may be stored in a mapping table. Preferably, the mapping table can be disposed in an internal memory to improve query efficacy.

The database can be easily maintained by adding, updating and deleting the corresponding records in the triple table and the bits of the related signatures. For example, when a triple is added to the RDF store, the subject and object partition locations are first checked, and thus a series of records with the corresponding partition identities is inserted into the triple table. Finally, the signatures of those partitions are updated by setting the bits with 1 whose locations are hashed by the URIs of the inserted triple.

Query Optimization Procedure

Figure 11:
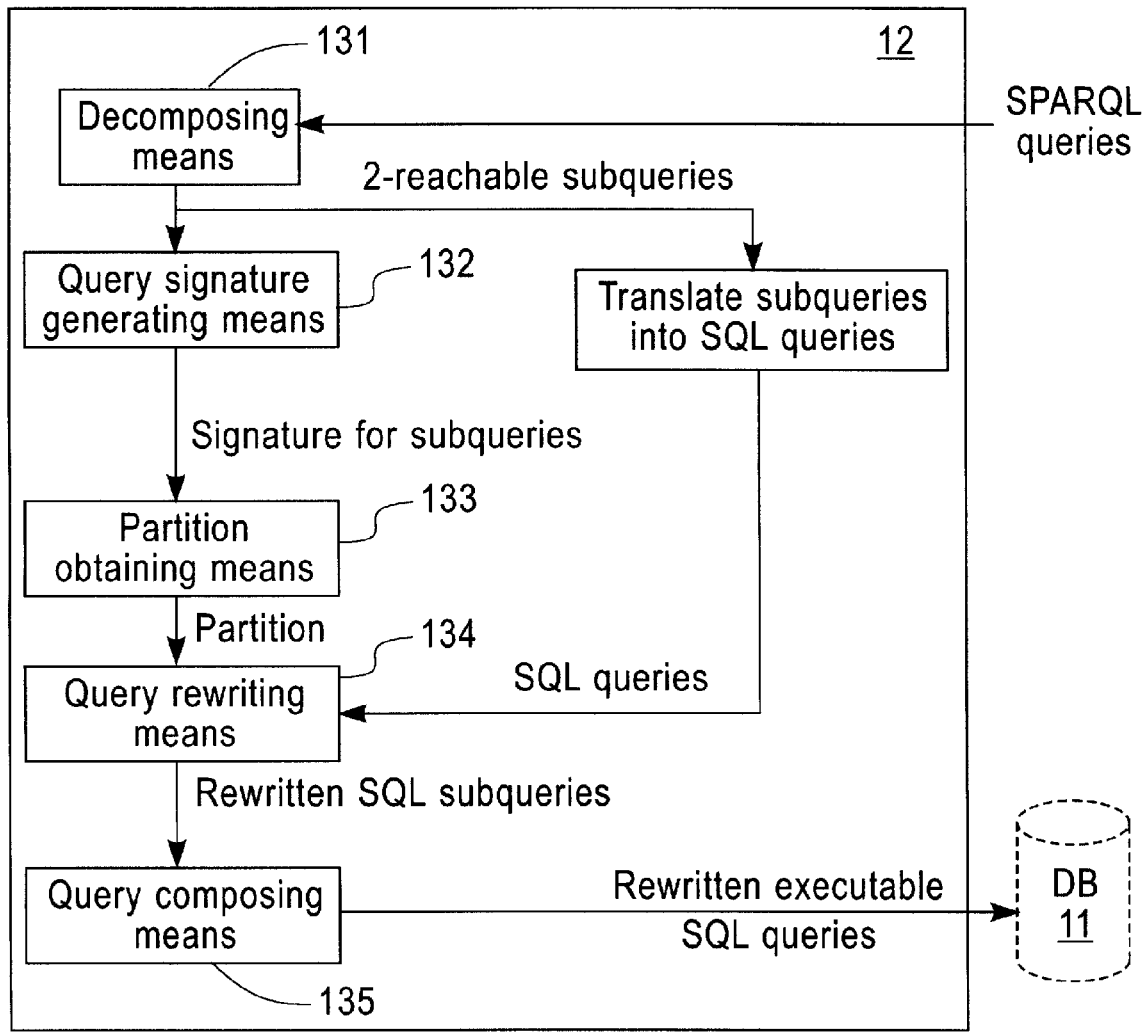
FIG. 11 illustrates a schematic view of a device for optimizing queries over a vertically stored database according to the present invention.

Description will be given to a database query optimization procedure according to the present invention. FIG. 11 illustrates a schematic view of a device 12 for optimizing queries over vertically stored database 11 according to the present invention.

As illustrated in FIG. 11, device 12 for optimizing queries over vertically stored database 11 according to the present invention may include: decomposing means 131 for decomposing an SPARQL received from a user into multiple SPARQL subqueries; query signature generating means 132 for generating a signature for each SPARQL subquery in a way corresponding to the above-described way to create a partition signature; partition obtaining means 133 for obtaining all partitioning matching an SPARQL subquery by comparing the signature of the SPARQL with signatures of all partitions; query rewriting means 134 for rewriting a SQL subquery translated from the SPARQL subquery based on matching partitions, in order to obtain a rewritten SQL subquery; and query composing means 135 for written SQL subqueries for all SPARQL subqueries to form a written SQL query, in order to perform a query over database 11 using the written SQL query.

Figure 12:
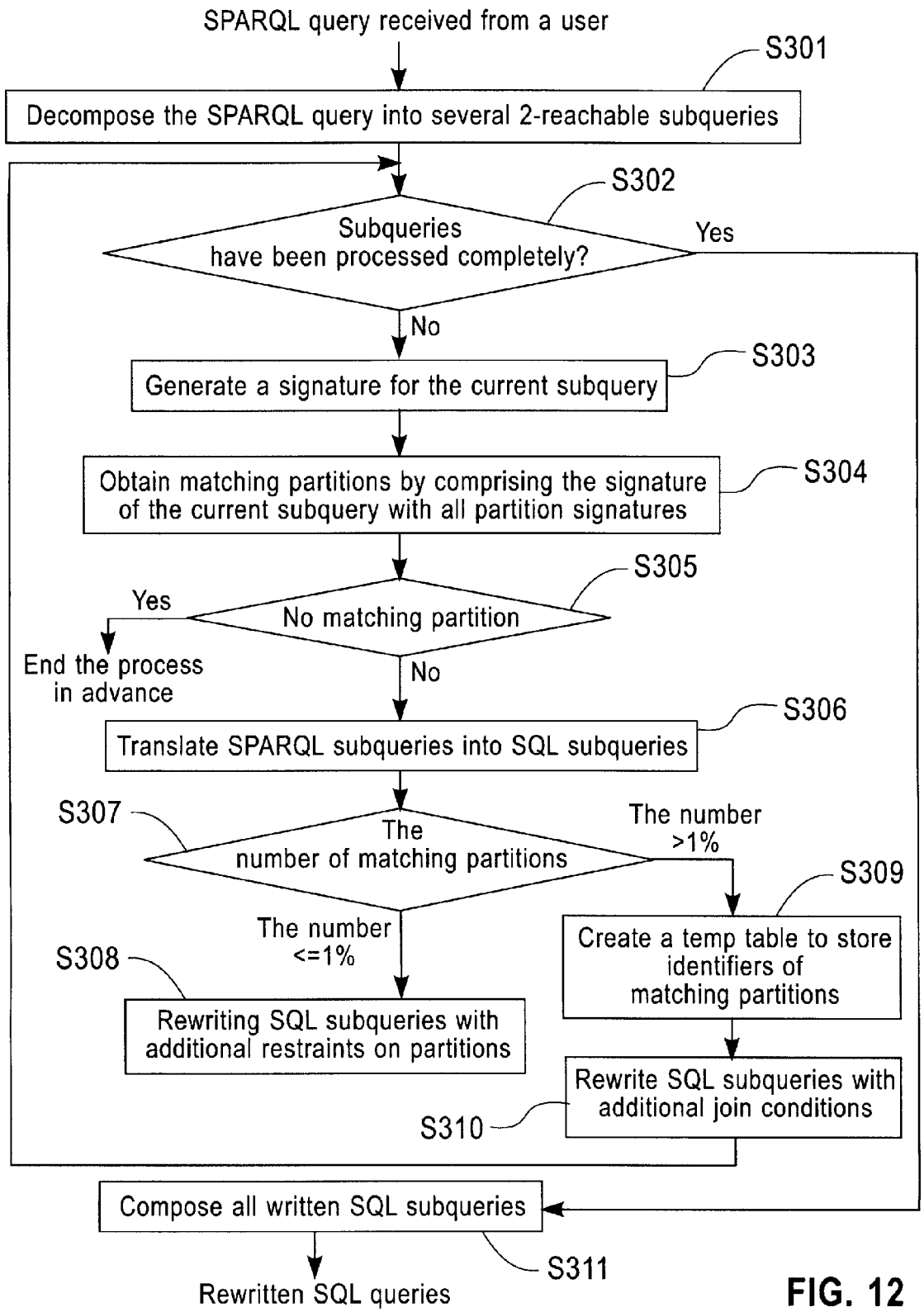
FIG. 12 illustrates a schematic view of a method for optimizing queries over a vertically stored database according to the present invention.

Referring to FIG. 12, a detailed description will be given to the operation of each component of device 12 for optimizing queries over a vertically stored database according to the present invention.

In step S301, decomposing means 131 decomposes an SPARQL query received from a user into multiple SPARQL subqueries. Specifically, the SPARQL query is mapped to a query graph, and 2-reachable subgraphs in the query graph are enumerated, each of which corresponds to a SPARQL subquery. Here, the 2-reachable graph is a graph in which any vertices are reached by at most 2 links or edges. Specifically, among partition signatures, a 2-reachable subgraph with highest selectivity needs to be recursively found out from the query graph according to the number of matching partitions until all query nodes are contained in respective 2-reachable subgraphs.

Next, in step S302, judgment is made as to whether or not subqueries have been processed completely. If all subqueries have been processed, then the flow goes to step S311. If there is an unprocessed subquery, then the flow goes to step S303.

In step S303, query signature generating means 132 generates a signature for each SPARQL subquery. Here, a signature is generated for each SPARQL subquery in a way corresponding to the way to generate the partition signature. For example, a signature is generated for each SPARQL subquery using the same hash function as that for generating a partition signature.

In step S304, partition obtaining means 133 obtains all partitions matching a SPARQL subquery by comparing the signature of the SPARQL subquery with signatures of all partitions. Specifically, for the positions of 1 in the signature vector generated for the SPARQL subquery, corresponding positions in the signature vector of a partition are also set to 1, and then the SPARQL subquery matches the partition. Suppose the signature vector generated for the SPARQL subquery is 10010001, and signature of the partition illustrated in FIG. 8 is 10111011; since the three positions of "1" in the signature of the SPARQL subquery correspond to "1" in the signature of the aforesaid partition, the SPARQL subquery is determined to match the aforesaid partition.

In step S305, judgment is made as to whether or not a partition matching the SPARQL subquery is obtained in step S304. If not, then the query process ends in advance. That is to say, in the present invention, if it is determined there is no partition corresponding to the SPARQL subquery, then the query may end directly without the need to execute a query in order to learn whether there is data matching the user query. If a partition matching the SPARQL subquery is obtained in step S304, then the process goes to step S306.

In step S306, an SPARQL translator of the triple store is invoked to translate the SPARQL subquery into a SQL subquery. Then, the process proceeds to step S307.

In step S307, judgment is made as to whether or not the number of matching partitions is less than a predetermined number, for example, less than 1% of all partitions. If yes, then the process proceeds to step S308. Otherwise, the process proceeds to step S309.

In step S308, query rewriting means 134 rewrites the SQL subquery translated from the SPARQL subquery, in order to obtain a rewritten SQL subquery. Specifically, additional restraints on partitions matching the subquery are used to rewrite the SQL subquery in order to form a rewritten SQL subquery. For example, partitions are directly written into the "where" clause with constraints on the partition identifiers. Then, the process returns to step S302 in order to process the next SPARQL subquery.

In step S309, a temp table may be created to store unique identifiers of all partitions matching the SPARQL subquery. Then, the process proceeds to step S310.

In step S310, query rewriting means 134 may utilize additional join conditions related to the temp table where unique identifiers are stored, in order to form a rewritten SQL subquery. Specifically, the temp table containing unique identifiers of matching partitions is joined with the subquery to form a rewritten SQL subquery. Next, the process returns to step S302 in order to process the next SPARQL subquery. The join operation is a well known operation in the art, and details thereof are thereby omitted.

Finally, in step S311, query composing means 135 composes multiple rewritten SQL subqueries for all SPARQL subqueries to form a rewritten SQL query via which a query over database 11 is executed.

An example of the optimization procedure according to the present invention will be given below. For example, users submit a query as follows:

```
Select ?x
Where { ......
?x rdf:type :univ-bench#GraduateStudent.
?x :univ-bench #takesCourse :univ-bench#GraduateCourse0.
...... }
```

Generally, the query will be translated into the following SQL using a common RDF to SQL translation method:

```
Select T0.S as X from (select * from RDF as T where T.P='rdf:type'
and T.O=':univ-bench#GraduateStudent') as T0 inner join (select *
from RDF as T where T.P=':univ-bench#takesCourse' and
T.O=':univ-bench#GraduateCourse0') as T1 on T0.S=T1.S
```

With the optimizing method and device of the present invention, it will be further optimized into the following SQL:

```
select T0.S as X from (select * from (select RDF.ID, RDF.S,
RDF.P,RDF.O from RDF inner join A on RDF.ID=A.ID) as T where
T.P='rdf:type' and T.O=':univ-bench#GraduateStudent>') as T0 inner
join (select * from (select RDF.ID, RDF.S, RDF.P,RDF.O from RDF
inner join A on RDF.ID=A.ID) as T where
T.P=':univ-bench#takesCourse>' and
T.O=':univ-bench#GraduateCourse0>') as T1 on T0.S=T1.S and
T0.ID=T1.ID
```

The underlying portion of the above code represents added code after optimization. Then, a query over the database is executed using the optimized code.

Compared with the prior art, the present invention can improve the query efficacy because search is conducted only in partitions matching the subquery.

Additionally, compared with the prior art, when there is no partition matching the subquery, the present invention can end the query in advance without the need to execute a query over the database. Therefore, the query efficacy is improved significantly.

Figure 13:
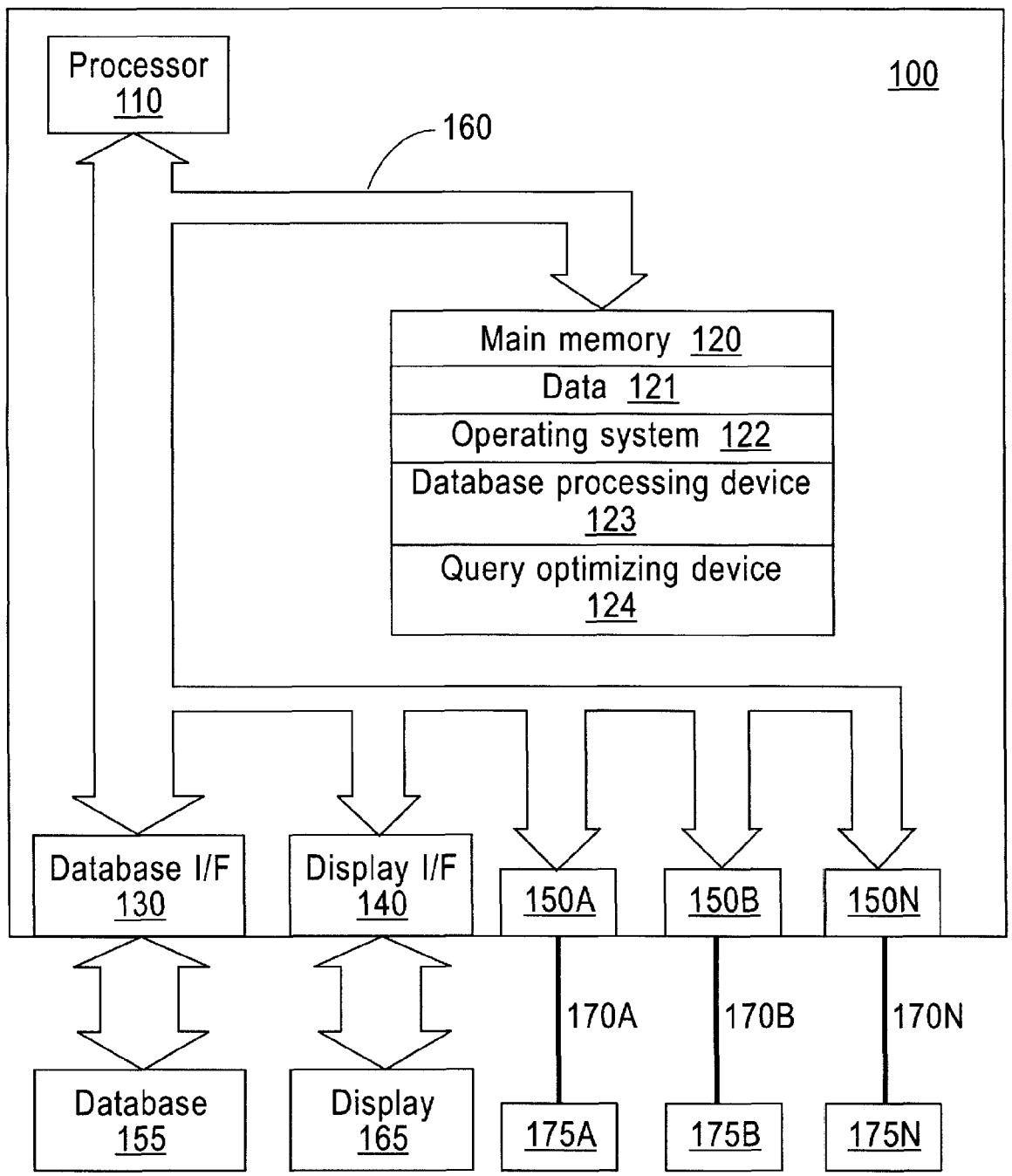
FIG. 13 illustrates a schematic view of a computer system in which the present invention may be implemented.

FIG. 13 illustrates a schematic view of a computer system 100 in which the present invention may be applied. Referring to FIG. 13, computer system 100 is a proper implementation of computer systems and includes the optimization method according to the present invention. Computer system 100 may be an IBM e Server System i computer system. However, it is to be understood to those skilled in the art that the present invention is also applicable to any computer system whether the computer system is a complex multi-user computer device, single-user workstation, embedded control system, or large parallel computer system such as a BlueGene computer system developed by IBM.

As illustrated in FIG. 13, computer system 100 includes one or more processors 110, a main memory 120, a large database interface 130, a display interface 140, and multiple network interfaces 150A, 150B and 150N. These system components are interconnected by a system bus 160. Large database interface 130 is for connecting a large database 155 to computer system 100. The database in FIG. 13 corresponds to database 11 in FIG. 11.

Main memory 120 preferably contains data 121, an operating system 122, and a database processing device 123 and a query optimizing device 124 according to the present invention. Data 121 represents any data input or output by any program in computer system 100. Operating system 122 may be any proper operating system. Database processing device 123 and query optimizing device 124 performs operation flows in FIG. 10 and FIG. 12 respectively.

Although data 121, operating system 122, database processing device 123, and query optimizing device 124 are located at main memory 120 in the figure, those of ordinary skill in the art may recognize that these items are not necessarily contained in main memory 120 simultaneously and completely.

Processor 110 may include one or more microprocessors and/or integrated circuits. It executes program instructions stored in main memory 120 which stores programs and data that are accessible to processor 110. When computer system 100 is started, processor 100 first executes program instructions constituting operating system 122.

Although computer system 100 illustrated includes only one processor and one system bus, those of ordinary skill in the art may recognize that the computer system may be implemented to include multiple processors and/or multiple system buses.

Display interface 140 is for directly connecting one or more displays 165 to computer system 100. These displays 165 may be unintelligent (i.e. dumb) terminals or completely programmable workstations, which are for providing system administrators and users with the ability to communicate with computer system 100. However, note although display interface 140 is provided in order to support communication with one or more displays 165, the computer system does not necessarily need displays 165 because all desired interactions with users and other processes may be implemented via one or more network interfaces.

Network interfaces denoted by 150A, 150B, . . . , 150N in FIG. 13 are for connecting computer system 100 via independent networks (such as 170A, 170B, . . . , 170N) to other computer system or workstation. Network interfaces 150A, 150B, . . . , 150N and networks 170A, 170B, . . . , 170N represent any proper way to interconnect electronic devices in a broad sense, no matter whether these networks include current analog and/or digital technologies or pass some future networking mechanisms. Additionally, networks may be implemented via different network protocols which are dedicated computer programs allowing computers to communicate via networks. TCP/IP (Transfer Control Protocol/Internet Protocol) is an example of a proper network protocol.

It should be specially noted that the foregoing description is a situation under a full-functionality computer system environment. Those skilled in the art should recognize that the present invention may be embodied in a computer program product arranged on a signal bearing medium for the use of any proper data processing system. Such a signal bearing medium may be a transmission medium or a recordable medium used for machine-readable information, including a magnetic medium, optical medium or other proper medium. Examples of the recordable medium include floppy or magnetic discs in a hard-disc driver, optical discs for a CD driver, magnetic tapes, and other medium those skilled in the art can conceive. Those skilled in the art should recognize that any communication terminal with proper programming means is able to perform steps of the method of the present invention embodied in, for example, a program product.

As is clear from the foregoing description, modifications and alterations can be made to each embodiment of the present invention without departing from the spirit of the present invention. The description in the specification has been presented for the purpose of illustration and is not intended to be restrictive. The scope of the present invention is restricted by the claims only.

The invention claimed is:

1. A method for optimizing queries over a vertically stored database having items that are partitioned into several partitions each having a partition signature representing items therein, the method comprising:
    decomposing a first query received from a user into multiple first subqueries;
    generating a signature for each first subquery in a way corresponding to a way of generating the partition signature;
    comparing the signature of the each first subquery with the partition signatures of all partitions, in order to obtain all partitions matching the first subquery;
    rewriting a second subquery translated from the first subquery based on the matching partitions, in order to obtain the rewritten second subquery; and
    composing rewritten second subqueries for all the first subqueries to form a second query so that queries are executed over the database using the second query;
    wherein the database is an resource description framework (RDF) store in which each item contains RDF triples, the RDF store contains a subject column whose value represents RDF triple subjects, a property column whose value represents RDF triple properties, and an object column whose value represents RDF triple objects, and the RDF store further contains a unique identifier column whose value represents partitions where corresponding RDF triples are located.

2. The method according to claim 1, wherein the first query and first subqueries are SPARQL queries, and the second subqueries and second query are SQL (Structured Query Language) queries.

3. The method according to claim 1, wherein all items in the RDF (Resource Description Framework) store are mapped to a graph representing all RDF triples, RDF triple subjects are represented by source nodes in the graph, RDF triple objects by sink nodes in the graph, and RDF triple properties by directed connections from source nodes to sink nodes, and the graph is partitioned into several subgraphs each corresponding to a partition.

4. The method according to claim 3, wherein connections within subgraphs are denser, connections between subgraphs are sparser, and for each connection between subgraphs, a copy of the connection is made in each of related subgraphs so that subgraphs can reflect all data relationships in the RDF store after the partition.

5. The method according to claim 1, wherein the partition signature is obtained in such a way that a signature is generated for each item in a partition using hash functions and that an "OR" operation is performed on the signature of each item.

6. The method according to claim 1, wherein the decomposing step further comprises:
    mapping the first query to a query graph, and
    enumerating 2-reachable subgraphs corresponding to a first subquery in the query graph.

7. The method according to claim 1, wherein the signature for the each first subquery is generated via the same hash functions as those for generating the partition signature.

8. The method according to claim 7, wherein the hash functions are MD5 hash functions.

9. The method according to claim 8, wherein when positions of 1 in the signature generated for a first subquery are also set to 1 in the signature of a partition, the first subquery matches the partition.

10. The method according to claim 1, wherein the query process ends in advance if no partition matching the first subquery is obtained in the obtaining step.

11. The method according to claim 1, wherein the partition has a unique identifier, and the rewriting step further comprises:
    creating a temp table for storing unique identifiers of all partitions matching the first subquery, and
    rewriting the second subquery using additional join conditions related to the temp table where unique identifiers are stored.

12. The method according to claim 1, wherein when the number of partitions matching the first subquery is larger than a predetermined value, the rewriting step comprises:
    creating a temp table for storing unique identifiers of all partitions matching the first subquery, and
    rewriting the second subquery using additional join conditions related to the temp table where unique identifiers are stored; and when the number of partitions matching the first subquery is less than a predetermined value, the rewriting step comprises:
    rewriting the second subquery using additional restraints on partitions matching the subquery.

13. A device for optimizing queries over a vertically stored database, wherein items in the database are partitioned into several partitions each having a partition signature representing items in it, the device comprising:
    decomposing means for decomposing a first query received from a user into multiple first subqueries;
    query signature generating means for generating a signature for each first subquery in a way corresponding to a way of generating the partition signature;
    partition obtaining means for comparing the signature of the each first subquery with the partition signatures of all partitions, in order to obtain all partitions matching the first subquery;
    query rewriting means for rewriting a second subquery translated from the first subquery based on the matching partitions, in order to obtain the rewritten second subquery; and
    query composing means for composing rewritten second subqueries for all the first subqueries to form a second query, whereby queries are executed over the database using the second query;
    wherein the database is an resource description framework (RDF) store in which each item contains RDF triples, the RDF store contains a subject column whose value represents RDF triple subjects, a property column whose value represents RDF triple properties, and an object column whose value represents RDF triple objects, and the RDF store further contains a unique identifier column whose value represents partitions where corresponding RDF triples are located.

* * * * *